(12) United States Patent
Wade et al.

(10) Patent No.: US 12,520,008 B1
(45) Date of Patent: Jan. 6, 2026

(54) INSTALLATION AND CONFIGURATION OF MEDIA DEVICES IN MULTI-DWELLING UNIT (MDU) ENVIRONMENT

(71) Applicant: DISH Network L.L.C., Englewood, CO (US)

(72) Inventors: Joshua D. Wade, Castle Rock, CO (US); Aaron William Schwartz, Denver, CO (US); Clark Hurst Pendery, Englewood, CO (US); Vinaya Sri Yerneni, Englewood, CO (US); Jason Anthony Madruga, Castle Rock, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 18/825,087

(22) Filed: Sep. 5, 2024

(51) Int. Cl.
H04N 21/45 (2011.01)
H04N 21/214 (2011.01)
H04N 21/262 (2011.01)

(52) U.S. Cl.
CPC ..... *H04N 21/4516* (2013.01); *H04N 21/2143* (2013.01); *H04N 21/26291* (2013.01)

(58) Field of Classification Search
None
See application file for complete search history.

(56) References Cited

U.S. PATENT DOCUMENTS

| 8,458,758 | B1 * | 6/2013 | Nguyen | H04N 21/6587 |
| | | | | 725/135 |
| 9,736,541 | B1 * | 8/2017 | Nijim | H04N 21/41265 |
| 9,872,055 | B1 * | 1/2018 | Mathews | H04N 21/64738 |
| 2003/0083938 | A1 * | 5/2003 | Smith | G06Q 30/02 |
| | | | | 705/14.66 |
| 2003/0219081 | A1 * | 11/2003 | Sheehan | H04N 21/26291 |
| | | | | 348/E5.006 |
| 2005/0226170 | A1 * | 10/2005 | Relan | H04N 21/25816 |
| | | | | 348/E7.071 |
| 2007/0107019 | A1 * | 5/2007 | Romano | H04N 5/782 |
| | | | | 725/135 |

(Continued)

FOREIGN PATENT DOCUMENTS

| CN | 108363584 A | * | 8/2018 | | H04N 21/8173 |
| KR | 20130059786 A | * | 6/2013 | | H04N 21/4135 |

*Primary Examiner* — William J Kim
(74) *Attorney, Agent, or Firm* — Kilpatrick Townsend & Stockton LLP (57) ABSTRACT

Methods, systems, and devices related to configuration of media devices in a multi-dwelling unit (MDU) environment are provided. In one example, a method includes obtaining media device information about a media device to be installed in an MDU property of an MDU. The media device information is extracted from a machine-readable (MR) identifier on the media device. The method further includes obtaining an MDU property identifier of the MDU property, identifying a pre-established MDU property profile corresponding to the MDU property identifier, identifying a media device configuration profile corresponding to the media device, based on the media device information and the MDU property profile, receiving the media device configuration profile in the media device, automatically performing configuration according to the received configuration profile, and generating a notification indicating that the configuration of media device is completed.

20 Claims, 6 Drawing Sheets

(56) References Cited

U.S. PATENT DOCUMENTS

| | | | |
|---|---|---|---|
| 2007/0209052 A1* | 9/2007 | Taylor | H04N 21/25833 |
| | | | 348/E7.071 |
| 2010/0154009 A1* | 6/2010 | Del Sordo | H04N 21/43637 |
| | | | 725/62 |
| 2011/0066679 A1* | 3/2011 | Irvine | H04N 21/8173 |
| | | | 709/203 |
| 2011/0161396 A1* | 6/2011 | Filbrich | H04L 65/1094 |
| | | | 709/203 |
| 2011/0162020 A1* | 6/2011 | Kahn | H04N 21/4583 |
| | | | 725/85 |
| 2011/0307548 A1* | 12/2011 | Fisk | H04N 21/2143 |
| | | | 709/203 |
| 2012/0162515 A1* | 6/2012 | Lee | H04N 21/4223 |
| | | | 455/414.1 |
| 2012/0260282 A1* | 10/2012 | Dasher | H04N 21/4753 |
| | | | 725/62 |
| 2014/0071161 A1* | 3/2014 | Joseph | H04N 21/6377 |
| | | | 348/E7.003 |
| 2014/0075485 A1* | 3/2014 | Lee | H04N 21/42204 |
| | | | 725/116 |
| 2016/0105718 A1* | 4/2016 | Xu | H04N 21/222 |
| | | | 725/25 |
| 2018/0359503 A1* | 12/2018 | Wang | H04N 5/783 |
| 2019/0081811 A1* | 3/2019 | Miller | H04L 12/282 |
| 2021/0281717 A1* | 9/2021 | Smith | H04N 21/43615 |
| 2021/0297732 A1* | 9/2021 | Marom | H04N 21/4181 |
| 2021/0297749 A1* | 9/2021 | Marom | H04N 21/2347 |
| 2023/0353916 A1* | 11/2023 | Matatyaou | G06F 9/45541 |
| 2024/0107122 A1* | 3/2024 | Akhoury | H04N 21/4828 |

* cited by examiner

INSTALLATION AND CONFIGURATION OF MEDIA DEVICES IN MULTI-DWELLING UNIT (MDU) ENVIRONMENT

BACKGROUND OF THE DISCLOSURE

Multi-dwelling units (MDUs) are premises that contain multiple separate zones, rooms, or units, within a single structure, such as apartment buildings, condominiums, and hotels. Each zone or room or unit in an MDU requires individual access to services like television, internet, and phone. A media device, such as a set-back box (SBB), set-top box (STB), television (TV), television receiver, or similar devices installed in each zone or room or unit within the MDU. Media devices connect to the network of the MDU, receive and process media content from content providers, and provide tenants with access to streaming services, such as television channels, video on demand (VoD), and internet services. Media devices need to be set up and configured properly to facilitate the reception, decoding, and provision of content streams to user devices associated with the MDU.

BRIEF SUMMARY OF THE DISCLOSURE

In accordance with some embodiments of the present disclosure, a method is provided. The method is performed by a content management system. In one example, a method includes: accessing, by the content management system, media device information about a media device to be installed in a multi-dwelling unit (MDU) property. The media device information is extracted, by an installer device operable by a media device installer, from a machine-readable (MR) identifier on the media device and transmitted to the content management system from the installer device. The method further includes accessing, by the content management system, an MDU property identifier of the MDU property, identifying, by the content management system, an MDU property profile corresponding to the MDU property identifier, identifying, by the content management system, a media device configuration profile corresponding to the media device, based at least in part on the media device information and the MDU property profile, and transmitting, by the content management system, the media device configuration profile to the media device to enable the media device to perform a configuration according to the media device configuration profile. In some embodiments, the media device is a set-back box (SBB) or a set-top box (STB). In some embodiments, the media device is a television (TV) containing a television receiver.

In accordance with some embodiments of the present disclosure, a media device is provided. In one example, the media device includes: one or more processors and a computer-readable storage media storing computer-executable instructions. The computer-executable instructions, when executed by the one or more processors, cause the media device to receive a pre-established media device configuration profile. The pre-established configuration profile is generated by a content management system based at least in part on the media device information and a pre-established MDU property profile. The media device information is extracted from the MR identifier and accessed by the content management system, the pre-established MDU property profile is stored in a database of the content management system and identified by the content management system based on an MDU property identifier accessed by the content management system. The computer-executable instructions, when executed by the one or more processors, further cause the media device to automatically perform a configuration according to the media device configuration profile. The computer-executable instructions, when executed by the one or more processors, further cause the media device to receive a content item from a content provider. The content item is requested by an MDU user of the MDU property and sent from a UE connected to the media device. The computer-executable instructions, when executed by the one or more processors, further cause the media device to generate content streams of the requested content item, based at least in part on predetermined streaming parameters indicated in the media device configuration profile and transmit the content streams to the UE for the MDU user to view.

In accordance with some embodiments of the present disclosure, a system for provisioning streaming service to a user of an MDU is provided. In one example, the system includes a media device, an installer device operable by a media device installer, a content management system, and a user equipment (UE). The installer device is configured to scan the MR identifier and extract the media device information encapsulated in the MR identifier, obtain an MDU property identifier of the MDU property, and transmit the media device information and the MDU property identifier to the content management system. The content management system is configured to identify a pre-established MDU property profile corresponding to the MDU property identifier, identify a media device configuration profile corresponding to the media device, based at least in part on the media device information and the MDU property profile, and transmit the media device configuration profile to the media device. The media device is configured to receive the media device configuration profile and automatically perform a configuration according to the received configuration profile. The media device is further configured to receive a content item from a content provider, and the content item is requested by an MDU user of the MDU property and sent from a UE connected to the media device. The media device is further configured to generate content streams of the requested content item, based on predetermined streaming parameters indicated in the media device configuration profile and transmit the content streams to the UE.

In accordance with some embodiments, the present disclosure also provides a non-transitory machine-readable storage medium encoded with instructions, the instructions executable to cause one or more electronic processors of a system or a computer device to perform the methods or processes described herein.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE DISCLOSURE

The present disclosure provides devices, systems, and methods for installation and configuration a media device in an MDU environment and provisioning content and streaming services using the media device within the MDU environment.

Traditionally, media devices such as SBBs, STBs, TVs, TV receivers, etc., are installed and configured manually by an installer (i.e., a media device installer) or technician. Take SBB for an example, the process of installing SBBs in an MSU may involve at least the following steps: the installer must plug in the SBB in a designated MDU zone or room, connect the SBB to the MDU network, authenticate the SBB, configure the SBB with the necessary settings, accept various terms of services, and verify the installation and configuration. These procedures must be repeated for every individual SBB, making the entire process highly time-consuming and inefficient, particularly when a large number of SBBs (e.g., hundreds or thousands) need to be installed in the MDU at one time. Further, each step of the manual configuration process requires careful attention to detail, and any mistakes in entering configuration parameters can lead to device malfunction or service disruptions. The repetitiveness of the process increases the likelihood of human error, which can result in inconsistencies in the configurations of multiple SBBs.

The present disclosure provides techniques to address at least the above-identified challenges. One insight provided in the present disclosure is related to an automated process to streamline the installation and configuration of media devices in MDUs. According to some embodiments of the present disclosure, a method includes obtaining information about a to-be-installed media device (e.g., SBB, STB, TV, TV receiver, etc.) by scanning a machine-readable (MR) identifier of the media device to extract the media device information and send it to a content management system. The content management system also receives an MDU property identifier of the MDU property in which the media device is to be installed. The content management system identifies a pre-established MDU property profile corresponding to this identifier and a media device configuration profile based on the media device information and MDU property profile. The configuration profile is sent to the media device, which automatically configures itself according to the received media device configuration profile and the pre-set configuration parameters included therein and generates a notification indicating the completion of the configuration.

By automating the retrieval and application of pre-established media device configuration profiles, the present automated process can significantly reduce the time and effort required for media device installation, particularly in large-scale deployments involving hundreds or thousands of media devices in an MDU environment. The present process also eliminates the need for installers to manually input configuration settings, minimize the risk of human error, and improve consistency across all media devices. The present process can lead to more efficient deployments, fewer service disruptions, and a more streamlined setup process to enhance overall productivity and reliability.

Figure 1:
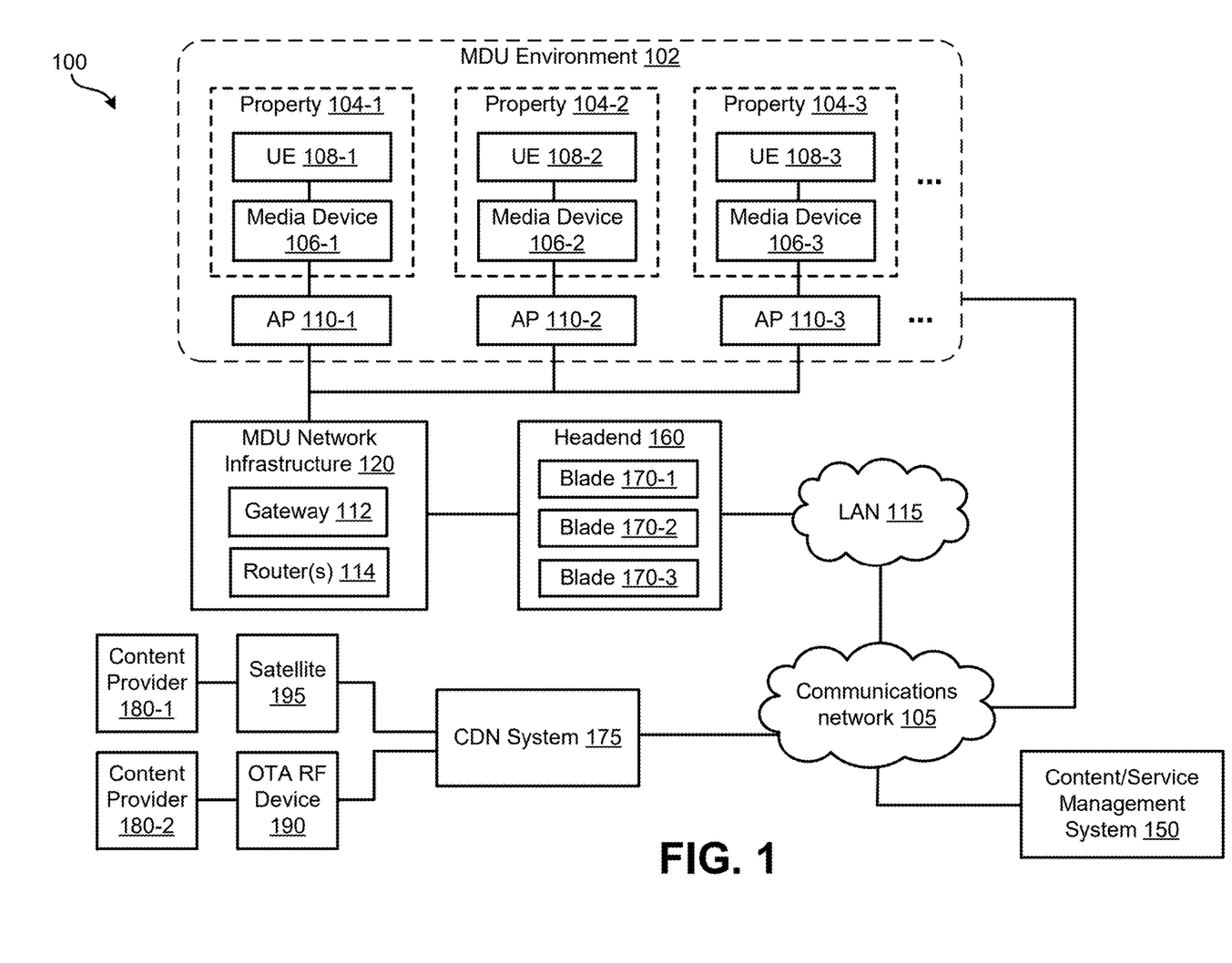
FIG. 1 is a schematic diagram illustrating an example of a communications system according to various embodiments.

FIG. 1 is a schematic diagram illustrating an example of a communications system 100 (also referred to as "system 100") according to various embodiments. In the illustrated example, the system 100 includes, among other components, an MDU environment 102 (also referred to as "MDU 102"), MDU network infrastructure 120, content/service management system 150 (sometimes also referred to as a "content management portal"), headend 160 (sometimes also referred to as a "smart box"). Various components of system 100 are in communication with each other via network 105 and/or the local area network (LAN) 115 of the MDU 102 in connection with the network 105. Each component within the system 100 may be a hardware component, a software component, or a combination of both operable and configured to perform intended functions. Fewer or additional components may be included in system 100.

The MDU environment 102 used herein refers to a residential or commercial building or complex that contains multiple compartments or separate units within a single structure. Examples of MDUs include apartment buildings including multiple individual apartments within a single building, condominiums in which individual units are owned by their occupants but the common areas and facilities are shared, townhouses or similar buildings with multi-story units, co-operative housing that operates under a different ownership and governance model in which the residents collectively manage the property, duplexes and triplexes, multiplexes, hospitality establishments, hotels, motels, dormitories, lofts, a senior living center, a college or university campus, an apartment complex, among others.

Within the MDU environment 102 further are located multiple MDU properties 104 (e.g., 104-1, 104-2, 104-3, etc.). Each MDU property 104 is a compartment or a unit of the MDU such as a zone, a room, a common area, etc. of the MDU. For example, the MDU 102 may be a hotel, and the MDU properties 104 may be a lobby, a gym, a swimming pool area, a dining area, a guest room (e.g., standard guest room, premium guest room, etc.), a conference room, etc., within the hotel.

Within each MDU property 104 are located one or more UEs 108 (e.g., 108-1, 108-2, 108-3, etc.). The UEs may be owned, operated, controlled by various users of the MDU 102 (e.g., tenants, residents, guests, employees, staffs, administrators, etc.) across the multiple units of the MDU 102. A household or a user of each property 104 of the MDU 102 may have one or more UEs 108. The users in within the same MDU 102 may not share their UEs 108. However, UEs 108 within one single MDU property 104 of the MDU 102 may be interconnected through LAN 115 such as a wireless network or a wired network. The UE 108 is generally used to any devices that are used by the user to access the communications network 105 to receive, stream, play, and present media content from any content sources internal within the MDU 102 and external to the MDU 102 (e.g., from a content provider 180). The UE 108 may be a fixed device in the MDU property 104 or a mobile device carried by an MDU user. Examples of UE 108 include televisions (TV) and smart TVs, gaming consoles, smartphones, computers, tablets, wearables, streaming sticks, smart projectors, virtual reality and augmented reality (VR/AR) devices, and so on. The UEs 108 may communicate with the headend 160 and/or access the communications network 105 through one or more access points (APs) 110 (e.g., 110-1, 110-2, 110-3, etc.).

The APs 110 are generally network devices that extend the network coverage within the MDU 102, enable the UEs 108 to connect to the headend 160, the LAN 115, as well as the network 105. In some embodiments, an AP (e.g., 110-1) may be installed within the property 104-1 of the MDU 102 and exclusively used by UEs 108-1 within the property 104-1. Alternatively, the AP 110 may be installed in a common area of the MDU 102 and shared by UEs 108 across various MDU properties 104 of the MDU 102. In some embodiments, the APs 110 may be used to locate a device within the MDU 102 using Wi-Fi based location tracking techniques The headend 160 functions as a central hub for the communication of UEs 108 of the individual MDU properties 104 within the MDU 102. The headend 160 may be a branded smart box of a content/service provider, or a smart box designed and provided by a third party. In some embodiments, the headend 160 is installed in the MDU 102 by the MDU administrator (e.g., a property manager). In some embodiments, the headend 160 further includes multiple streaming blades 170 (e.g., 170-1, 170-2, 170-3, etc.) operable and configured to stream the content received from the content providers 180. Each streaming blade 170 includes a hardware component configured to enable streaming or content over either a LAN 115 or a wide area network (WAN) such as the network 105. Network 105 may be a wireless network, internet, cellular network such as 3G/4G/5G network, and various other public and/or private networks. The streaming blades 170 may include a specialized processing unit designed to communicate with content providers 180, receive content from the content delivery network (CDN) system 175, generate content segments of the received content, and handle streaming traffic. The streaming blades 170 can be used to support various types of streaming protocols and codecs, including popular protocols such as HTTP Live Streaming (HLS), Real Time Messaging Protocol (RTMP), Multicast IP based Streaming, and Dynamic Adaptive Streaming over HTTP (DASH).

In some embodiments, the streaming blade 170 can receive a variety of content from multiple content providers 180 including but not limited to satellite TV providers, cable network providers, internet streaming service providers, and other digital content sources, decode and reformat the content, transcode the content into different bitrates and resolutions to match the capabilities of various UEs 108 and to optimize for current network conditions, convert the content into segments, aggregate the content segments, and transmit the content aggregates to the individual media devices 106. In some embodiments, the streaming blade 170 is operable and configured to authenticate the MDU users, verify the credentials of users to ensure that only authorized individuals can access certain content, verify that the appropriate licenses are in place and manages the decryption of content protected by digital right management (DRM). In some embodiments, the streaming blade 170 is operable and configured to authenticate media devices 106 and UEs 108 to access streaming services and validate streaming certificates from the content provider 180.

The headend 160 is in communication with content providers 180 (i.e., 180-1, 180-2, etc.) through data transmission devices, such as over-the-air (OTA) radio frequency (RF) device 190 or satellite 195. Satellite 195 may be used to transmit content to the headend 160 over television and radio broadcasting, as well as for internet access in remote areas where traditional wired connections are not available. On the other hand, the OTA RF device 190 may be used to transmit content to the headend 160 over a wireless network, such as Wi-Fi or cellular networks. The content from the content provider 180 is delivered through the CDN system 175. For example, the CDN system 175 system may include a network of geographically distributed servers including origin servers, edge servers, content storage devices, and routing/balancing devices.

The MDU network infrastructure 120 provides support to facilitate communications between the UEs 108 and the headend 160 within the MDU 102. The MDU network infrastructure 120 may include an MDU gateway device 112, one or more router(s) 114 and other networking devices such as switches, firewall devices, network segmentation devices, etc. In some embodiments, the MDU gateway device 112 and the routers 114 are integrated. The MDU gateway device 112 can be connected to the headend 160 either through a wired or wireless connection. Once connected, the MDU gateway device 112 can assign unique IP addresses to each media device 106 or UE 108 or AP 110 within the network to allow them to communicate with each other and with devices outside the network. The content received by the headend 160 may be distributed to the media device 106 of each property 104 via the MDU gateway device 112.

In some embodiments, the headend 160 is separate from the MDU gateway device 112. The headend 160 is in communication with the content providers 180 and is configured to receive content from the content providers 180 and further transmit the content to the MDU gateway device 112, as illustrated in FIG. 1. Alternatively, the headend 160 and the MDU gateway device 112 are integrated to a single device.

The content management system 150 is in connection with the headend 160 of the MDU 102 and generally configured to store pre-established MDU property profile, pre-established media device configuration profile, content management and access policies, etc., and provide access to the profiles to authorized parties upon request. Examples of content/service management system 150 are described further with reference to FIG. 2.

Figure 2:
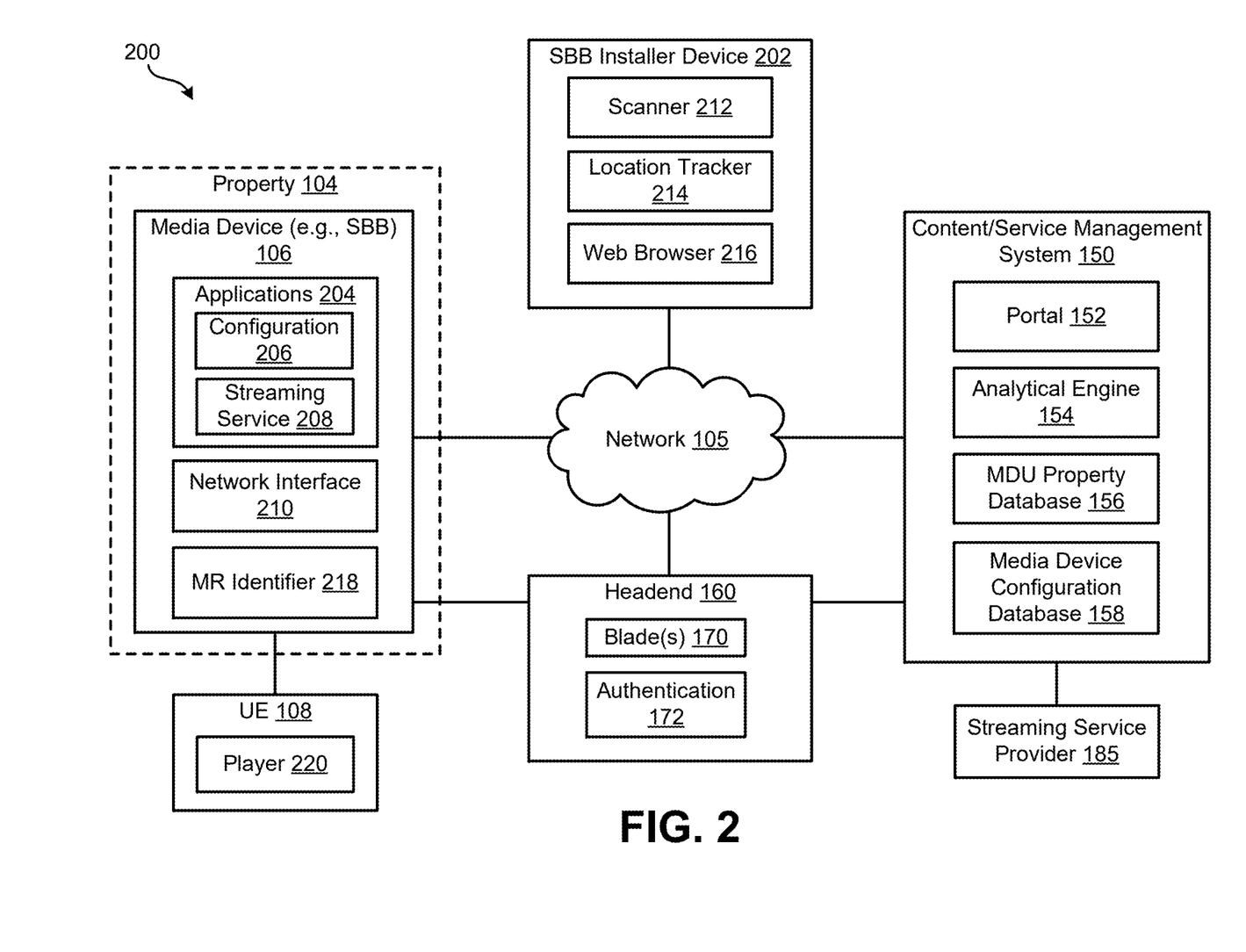
FIG. 2 is a schematic diagram illustrating another example of a communications system according to various embodiments.

FIG. 2 is a schematic diagram illustrating another example communications system 200 (hereinafter "system 200"). In the illustrated example, system 200 includes installer device 202, media device 106, headend 160, content management system 150. Various components of system 200 are in communication with each other through network 105. Each component within the system 200 may be a hardware component, a software component, or a combination of both operable and configured to perform intended functions. Fewer or additional components may be included in system 200.

In the illustrated example of FIG. 2, the media device 106 is designated to be installed within an MDU property 104 of MDU 102. The installation of media device 106 in property 104 is typically carried out by a technician associated with a streaming service provider 185, which supplies the media devices 106 and provides streaming services to MDU 102. In some scenarios, the technician may be tasked with installing and configuring multiple media devices 106 in various MDU properties 104 located across MDU 102. After being configured, the media device 106 is operable to send content streams to the UE 108 connected to the media device 106 for the MDU user to view.

The media device 106 may further include applications 204, network interface 210, and a machine-readable (MR) identifier 218, among other components such as electronic processor, operating system, memory, user interface, power supply, etc. The applications 204 may be stored in the memory of the media device 106 and further include configuration service 206 and streaming service 208. The network interface 210 enables the media device 106 to connect to the network 105. The configuration service 206 is responsible for the initial setup and configuration of the media device 106. Configuration of the media device 106 may include operating system configuration, network settings configuration, security settings configuration, among others. The streaming service 208 is executable to provide content streams to the UE 108 connected to the media device 106 in response to requests from MDU users. For example, the UE 108 may include a player 220, such as a media player application installed on the UE 108. The player 220 can be executed to receive content streams from the media device 106 and display the content streams on an output interface of the UE 108 for the MDU users to view.

The MR identifier 218 may be in a form of a MR code, a QR code, or other machine-readable forms. As mentioned above, the MR identifier 218 carries information of the media device 106 used for identification and configuration, including but not limited to, media device ID, firmware version, MAC address of media device 106, service provider ID, etc.

In the illustrated example of FIG. 2, the installer device 202 is operable by the technician to set up and configure media device 106 placed in property 104. The installer device 202 may be a user device such as a laptop, smartphone, tablet, or a specially designed computer device provided by the streaming service provider 185. The installer device 202 includes scanner 212, location tracker 214, and web browser 216, among other components such as electronic processor(s), memory, operating systems, memory, input/output ports, user interface, network interface, etc.

The scanner 212 may be a camera or similar component operable to scan the MR identifier 218 (e.g., a QR code) on the media device 106 and automatically extract media device information associated with the media device 106 such as the media device ID and MAC address. In some embodiments, the MR code is a quick response (QR) code that carries pre-encoded media device information of the media device 106.

The location tracker 214 is configured to track the location of the installer device 202 in the MDU 102 and determine the location of the MDU property in which the installer device 202 is placed. For example, if the technician places media device 106-1 in property 104-1 of MDU 102, the installer device 202 carried by the technician can automatically locate the property 104-1 and obtain the MDU property location information (e.g., the MDU property ID of the property 104-1) in which the media device 106-1 is to be installed and configured. Various techniques may be employed by the location tracker 214, including but not limited to global positioning system (GPS), Wi-Fi positioning system, Bluetooth beacon, radio frequency identification (RFID), visual recognition, etc. For example, the location tracker 214 can automatically determine the location information of the MDU property by implementing a Wi-Fi positioning technique. The location tracker 214 can detect multiple APs 110, and obtain AP data of each AP, including an AP location, SSID, MAC address, signal strength, etc. The location tracker 214 can send the AP data a location service provider associated with the MDU. The location service provider can perform a triangulation process to calculate the location of the installer device 202 relative to the detected APs, based on the AP data of the multiple APs detected by the installer device 202. The location tracker can determine the location of the MDU property based on the location of the installer device 202 relative to the AP locations of the detected APs and a pre-determined correlation map between the location of the MDU property and the AP locations.

In some embodiments, no location tracker 214 may be included in the installer device 202. The technician can simply visually recognize the property location information (such as the room number) and provide it to the content management system 150.

The web browser 216 is a software component installed on the installer device 202 and configured to provide the technician with access to the portal 152 of the content management system 150, display the webpage of the content management system 150, and allow the technician to interact with the content management system 150. The installer device 202 may receive prompts from the content management system 150, displayed on the web browser 216. For example, when a technician clicks the "Add a new media device" button on the portal 152 of the content management system 150 using the web browser 216, a request is sent from the content management system 150 to the installer device 202. This initiates the process of installing and configuring media device 106-1. The technician then follows the on-screen instructions to initiate the setup of the media device 106-1, including scanning the QR code on the media device 106-1.

In the illustrated example of FIG. 2, the content management system 150 further includes portal 152, an analytical engine 154, an MDU property database 156, and a media device configuration profile database 158, among other components. The portal 152 may be in a form of a user interface or web-based application to allow interaction with the content/service management system 159. The portal 152 facilitates transmissions of messages and data with external systems and devices, such as the installer device 202 and the streaming service provider 185. Operators can access and manage various aspects of the MDU environment 102 through portal 152.

The content management system 150 may receive various information about media device 106 and property 104 through the portal 152 in communication with the installer device 202 over the network 105. For example, when the scanner 212 of the installer device 202 scans the MR identifier 218 on the media device 106, the media device information carried in the MR identifier 218 is automatically extracted by the installer device 202 and sent to the content management system 150. The extracted information is received in the portal 152. The content management system 150 may receive the MDU information (e.g., MDU ID of the MDU 102) and MDU property information (e.g., MDU property ID).

The analytical engine 154 is operable to automatically identify a pre-established MDU property profile corresponding to the MDU property 104 in which the media device 106 is to be installed, based on the received MDU ID and MDU property ID. The MDU property profile is stored in the MDU property database 156 and may include content provider ID or a list of content provider IDs as well as various pre-determined rules and policies. The pre-determined rules and policies are based on a pre-established contract or agreement between the streaming service provider 185 and the MDU 102 and govern the content and streaming services to be provisioned to the MDU 102 and each MDU property 104. For example, the predetermined rules may specify the content provider, content (e.g., channel lists, TV programs, etc.), streaming quality, service availability, device management, etc., for each MDU property 104 within the MDU 102, based on the various factors such as the location of the property 104, the function of the property 104, the user experience level associated with the property 104, or other contractual arrangements. For example, the predetermined rules may specify that UE 108 associated with property 104-1 can access content provided by 10 content providers, and UE 108 associated with property 104-2 is restricted to access content provided by 3 content providers. Each property profile may include a list of content providers that provide content and service to the property and a list of permitted content and service provided by the content provider.

The analytical engine 154 is operable to analyze the extracted information about media device 106 and identify a pre-established media device configuration profile corresponding to the media device 106 and the MDU property profile of the MDU property 104 in which the media device 106 is to be installed. Pre-established media device configuration profiles are stored in the media device configuration profile database 158. The configuration settings may be determined by the streaming service provider 185 that provides the media device 106. In some embodiments, a media device configuration profile includes pre-set parameters for various settings such as IP address configuration settings, Wi-Fi settings for wireless network connection, proxy settings for connecting through a proxy server, bandwidth allocation settings, service quality settings (e.g., resolution and bitrate for streaming), encryption/decryption settings for streaming DMR-protected content, among others. In some embodiments, the media device configuration profile further includes pre-set configuration settings/parameters that are specific to each one of the content providers indicated in the corresponding MDU property profile.

In some embodiments, the analytical engine 154 may locate the media device configuration profile corresponding to the media device 106 in the media device configuration profile database 158, based on the media device ID contained in the extracted media device information from the MR identifier 218. The content management system 150 may send the configuration profile to the media device 106. In some embodiments, the content management system 150 may grant the media device 106 the access to the media device configuration profile and allow the media device 106 to fetch the media device configuration profile from the media device configuration profile database 158.

The content management system 150 is operable to send the identified configuration profile and property profile back to the media device 106 to allow the media device 106 to automatically perform configuration based on the configuration profile and the property profile. For example, the media device 106 obtains the network settings specified in the configuration profile. The network settings may include a static IP address, subnet mask, gateway, and DNS servers. The media device 106 applies the static IP settings to configure the static IP address, subnet mask, default gateway, and DNS servers as specified in the configuration profile. Configuration of the media device 106 may be verified by the installer or technician. Once the media device 106 is set up and configured with the configuration profile, it may transmit content streams to the UE 108 for the MDU users to view.

In some embodiments, the analytical engine 154 is operable to identify the headend 160 associated with the MDU 102, which may be indicated in the MDU property profile. The content management system 150 may send the identified media device configuration profile to the headend 160. The headend 160 may authenticate the media device 106, verify that the media device 106 is connected to the headend 160, and send the media device configuration profile to the media device 106.

In the illustrated example, the headend 160 further includes an authentication engine 172. The authentication engine 172 is operable to verify the identities of devices and users attempting to access the network and the services provided through the headend 160. The authentication engine 172 can validate the credentials of the media device 106, including the MAC address, IP address, or the unique device ID against a list of authorized devices. The authentication engine 172 can also authenticate the MDU users based on user login credentials, user profiles, or tokens, when the UE 108 associated with the MDU user is connected to the headend 160 or upon receiving a user request sent from the UE 108.

Figure 3:
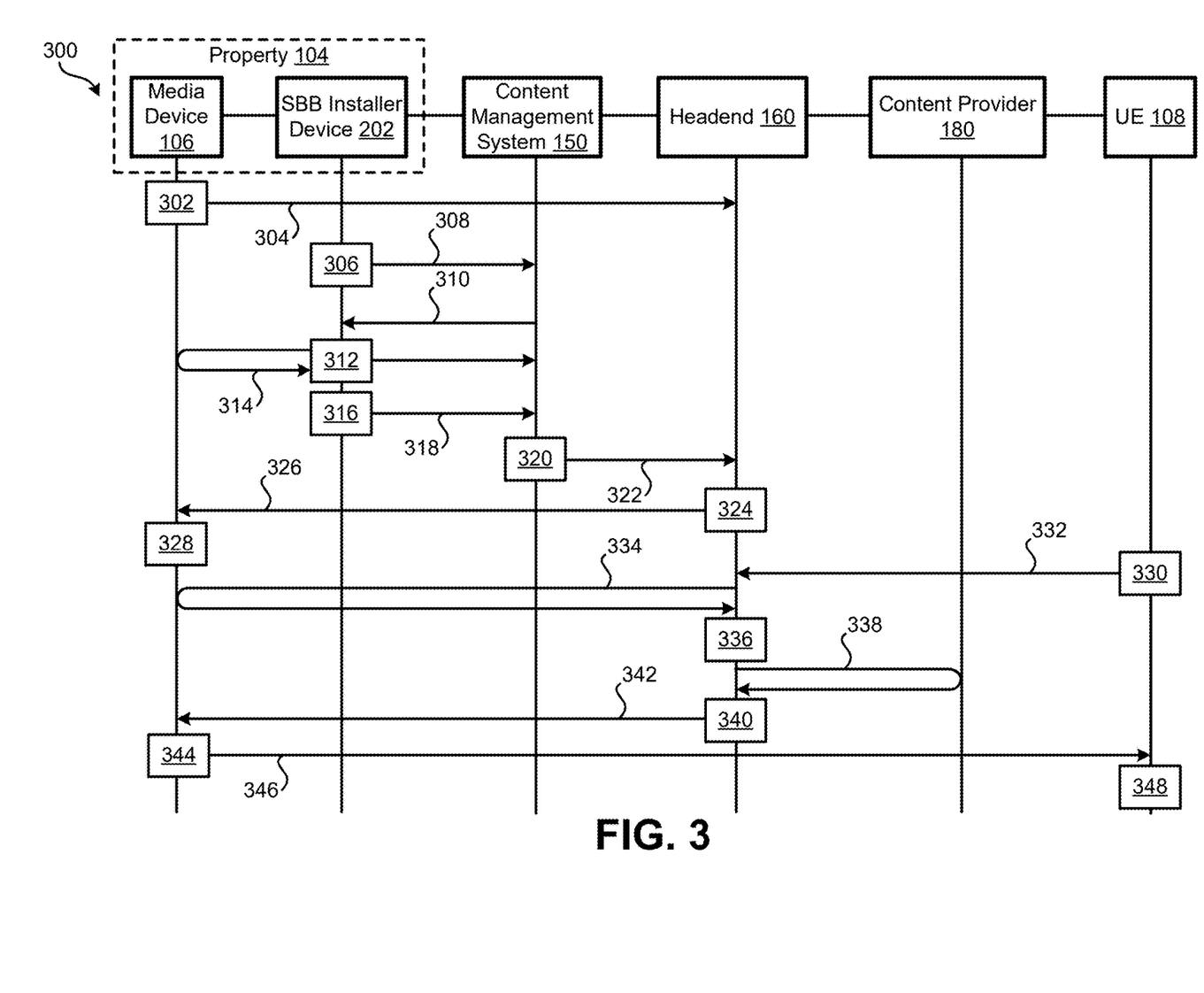
FIG. 3 illustrates an example of a message flow diagram according to various embodiments.

FIG. 3 is an example of a message flow diagram illustrating the interaction among the components during operation of the systems 100 and 200 of FIGS. 1-2. The media device 106 provided by a streaming service provider is placed in an MDU property 104 within MDU 102 and powered up by a technician associated with the streaming service provider. During initial installation, the media device 106 is connected to the network of the MDU. The media device 106 obtains (FUNCTION 302) a network IP address assigned by a router 114 of the MDU network infrastructure 120 within the MDU 102. The media device 106 sends (TRANSMISSION 304) the IP address to the headend 160 for the headend 160 to recognize the media device 106.

The installer device 202 is operable by the technician to execute an application (e.g., a web browser) to allow the technician to access a content management system 150. The installer device 202 sends (TRANSMISSION 308) a request for installing and configuring the media device 106 within the MDU 102 to the content management system 150. The content management system 150 in response sends (TRANSMISSION 310) a request for media device information to the installer device 202. The installer device 202 is operable to activate the scanner and scan (FUNCTION 312) the MR identifier on the media device 106, and extract and obtain (TRANSMISSION 314) the information about the media device 106 from the MR identifier. The extracted information includes the device ID and MAC address of the media device 106. The installer device 202 tracks the location of the installer device 202 and obtains (FUNCTION 316) the MDU ID and the MDU property ID of the property within which the media device 106 is to be installed. In some embodiments, the installer device 202 automatically identifies the location of the property and obtains the MDU property ID by execution of a location tracker application installed on the installer device 202. In some embodiments, the technician manually enters the MDU property ID using an interface of the installer device 202.

The installer device 202 sends (TRANSMISSION 318) the extracted media device information of the media device 106 and the MDU property information (e.g., the MDU ID and the MDU property ID) to the content management system 150 through the portal. The content management system 150 identifies (FUNCTION 320) the MDU property profile associated with the MDU property 104 based on the MDU ID and MDU property ID and identifies/locates/ generates (FUNCTION 320) a pre-established media device configuration profile corresponding to the media device 106 and the MDU property profile. The MDU property profile and the media device configuration profile are stored in a storage device of the content management system 150.

The content management system 150 sends (TRANSMISSION 322) the media device configuration profile to the headend 160. The headend 160 verifies (FUNCTION 324) that the media device 106 is connected to the network based on the IP address of the media device 106 and transmits (TRANSMISSION 326) the media device configuration to the media device 106. The media device 106 automatically performs (FUNCTION 328) configuration based on the predetermined configuration parameters included in the media device configuration profile.

The UE 108 connected to the media device 106 in property 104 is operable by an MDU user to execute (FUNCTION 330) the player and send a request for content streaming to the headend 160. In some embodiments, the request includes the user identity, user authentication information such as user credentials and user subscription status of the MDU user, and/or the device information of the UE 108. The headend 160 verifies the media device 106 by sending (TRANSMISSION 334) a request to media device 106 and receiving a response from the media device 106 indicating that the media device 106 is properly configured. The headend 160 further authenticates (FUNCTION 336) the MDU user and the UE 108 based on the MDU user information and/or device information of the UE 108.

Upon a determination that the media device is configured and the MDU user is entitled to access the request content, the headend 160 obtains the requested content (TRANSMISSION 338) from the content provider 180, converts (FUNCTION 340) the content into content segments or aggregates of content segments, and transmit (TRANSMISSION 342) the content segments or aggregates of content segments to the media device 106. The media device 106 processes or reforms (FUNCTION 344) the content segments according to predetermined configuration parameters of the media device configuration profile to generate content streams and the sends (TRANSMISSION 346) the content streams to the UE 108. The UE 108 receives the content streams and presents the content streams on a display device of the UE 108.

Figure 4:
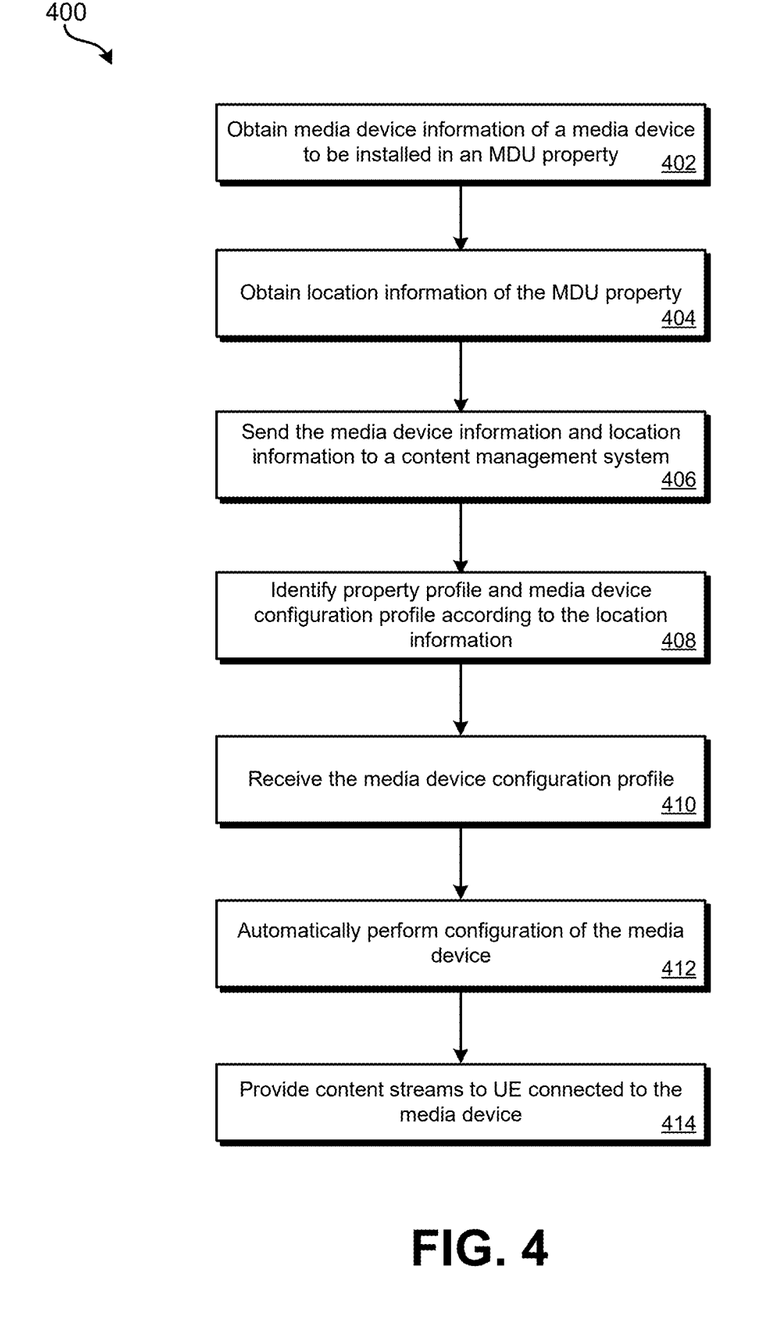
FIG. 4 illustrates a flow diagram of an example method according to various embodiments.

FIG. 4 illustrates a flow diagram of method 400 according to various embodiments of the present disclosure. Method 400 may be performed by the one or more components of systems 100 or 200, such as the media device 106, installer device 202, content management system 150, headend 160, etc. Method 400 includes process blocks of FIG. 4. However, fewer or additional process blocks may be included in method 400 in alternative embodiments. Process blocks of method 400 may be combined with process blocks of another method of the present disclosure in a suitable manner.

At 402, media device information of a media device to be installed in an MDU property of an MDU is obtained, by an installer device. In some embodiments, the media device information is extracted from an MR identifier on the media device, by an installer device. The installer device is operable by an authorized party (e.g., a technician associated with a streaming service provider that provides the media device). A request for media device information of the to-be-installed media device is received in the installer device. A scanner of the installer device is activated in response to the request, and the MR identifier is scanned by the scanner to capture the MR identifier and extract the media device information from the MR identifier. In some embodiments, the media device information includes a media device ID and an MAC address of the media device.

At 404, location information of the MDU property is obtained, by the installer device. In some embodiments, the location information of the MDU property is automatically identified by a location tracker of the installer device. The location information may include an MDU ID and an MDU property ID. The MDU property ID may include the floor number or zone number or room number of the MDU property. For example, multiple APs are detected by the installer device, and AP data of each AP is obtained, including an AP location, SSID, MAC address, signal strength, etc. The AP data is sent to a location service provider associated with the MDU. A triangulation process is performed by the location service provider to calculate the location of the installer device relative to the detected APs, based on the AP data of the multiple APs detected by the installer device, and the location of the MDU property is determined based on the location of the installer device relative to the AP locations of the detected APs and a pre-determined correlation map between the location of the MDU property and the AP locations. In some embodiments, the MDU property is identified by the technician and provided to the content management system through a portal of the content management system.

At 406, the media device information and MDU property information are sent to a content management system connected to the installer device via a communications network. In some embodiments, a web browser is activated on the installer device to access a web portal of the content management system, and the media device information and MDU property information are transmitted to and received in the content management system through the web portal.

At 408, an MDU property profile and a media configuration profile are identified by the content management system and located in a database of the content management system. The MDU property profile includes a list of content providers that provide content and service to the property and a list of permitted content and service provided by the content provider. In some embodiments, the MDU property profile further includes pre-determined policies and rules governing streaming service provisioning to the UEs associated with the MDU property. The media device configuration profile includes pre-set configuration parameters for configuring the media device. In some embodiments, the media device configuration profile includes pre-set network parameters, Wi-Fi parameters, proxy configuration parameters for connecting through a proxy server, user access control parameters, streaming configuration parameters, bandwidth allocation parameters, Quality of Service (QOS) parameters, encryption/decryption parameters, among others. In some embodiments, the media device configuration profile comprises pre-set user access control parameters, pre-set streaming configuration parameters, and other pre-set parameters associated with each one of the content providers indicated in the MDU property profile associated with the MDU property. In some embodiments, the media device configuration profile comprises preset parameters for the hardware and software components included in the media device 106.

In some embodiments, the content management system 150 automatically generates an media device configuration profile upon identification of the MDU property profile, based on the MDU property information from the MDU property profile and the media device information of media device that is to be installed in the MDU property.

At 410, the media device configuration profile is sent, by the content management system, to the media device. In some embodiments, the media device configuration profile is sent to a headend of the MDU, the media device is verified by the headend by the IP address assigned to the media device, and the media device configuration profile is sent by the headend to the media device. At 412, the media device automatically performs configuration according to the received media device configuration profile and the pre-set settings or parameters included therein without any human intervention. In some embodiments, a notification indicating that the configuration of media device is completed is generated and sent to the installer device, and the media device is verified, by the technician, that installation of the media device in the MDU property is completed and the configuration is proper. At 414, content streams are provided, by the media device to the UEs connected to the media device, in response to a user request.

Figure 5:
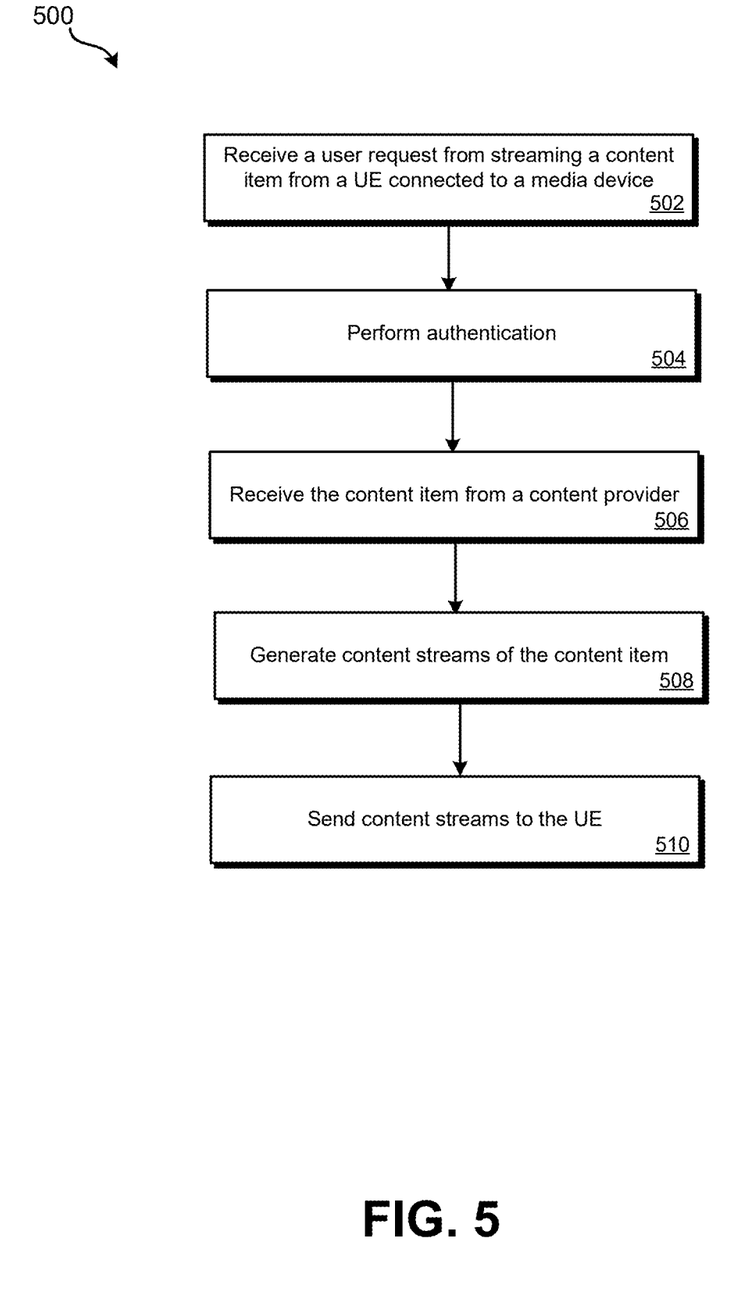
FIG. 5 illustrates a flow diagram of an example method according to various embodiments.

FIG. 5 illustrates a flow diagram of method 500 according to various embodiments of the present disclosure. Method 500 may be performed by the one or more components of systems 100 or 200. Method 500 includes process blocks of FIG. 5. However, fewer or additional process blocks may be included in method 500 in alternative embodiments. Process blocks of method 500 may be combined with process blocks of another method of the present disclosure in a suitable manner.

At 502, a user request is received in a headend associated with an MDU. The user request is sent from a UE connected to a media device installed in an MDU property of the MDU. The user request indicates a content item request by an MDU user associated with the UE and includes user information and UE information. The user information may include MDU user ID associated with a content provider that provides the requested content item and user authentication information such as user credentials and a subscription status with the content provider.

At 504, the MDU user is authenticated, by the headend, to access the requested content item, based on user information. In some embodiments, the UE is authenticated based to access the requested content item, based on the UE information. At 506, the requested content item is transmitted from the content provider to the headend and received in the headend. In some embodiments, content segments or aggregates of content segments of the requested content item are generated by the headend and transmitted to and received in the media device.

At 508, content streams are processed or generated by the media device, according to the predetermined streaming parameters specified in the configuration profile. In some embodiments, the content segments generated by the headend are converted/reformed by the media device into the content streams. In one example, the received content segments are decoded using codecs specified in the configuration profile, and the compressed content (e.g., video and audio content) is converted into an uncompressed format. The decoded content is transcoded into the required format, bitrate, and resolution as specified in the configuration profile. In some embodiments, DRM protocols specified in the configuration profile for the content provider that provides the requested content item are applied by the media device to the content. The transcoded content is converted into a streaming format suitable for delivery to the UE 108, according to the segment duration and packing parameters specified in the configuration profile. At 510, the content streams are sent from the media device to the UE to stream and present to the MDU user on a display device of the UE.

Figure 6:
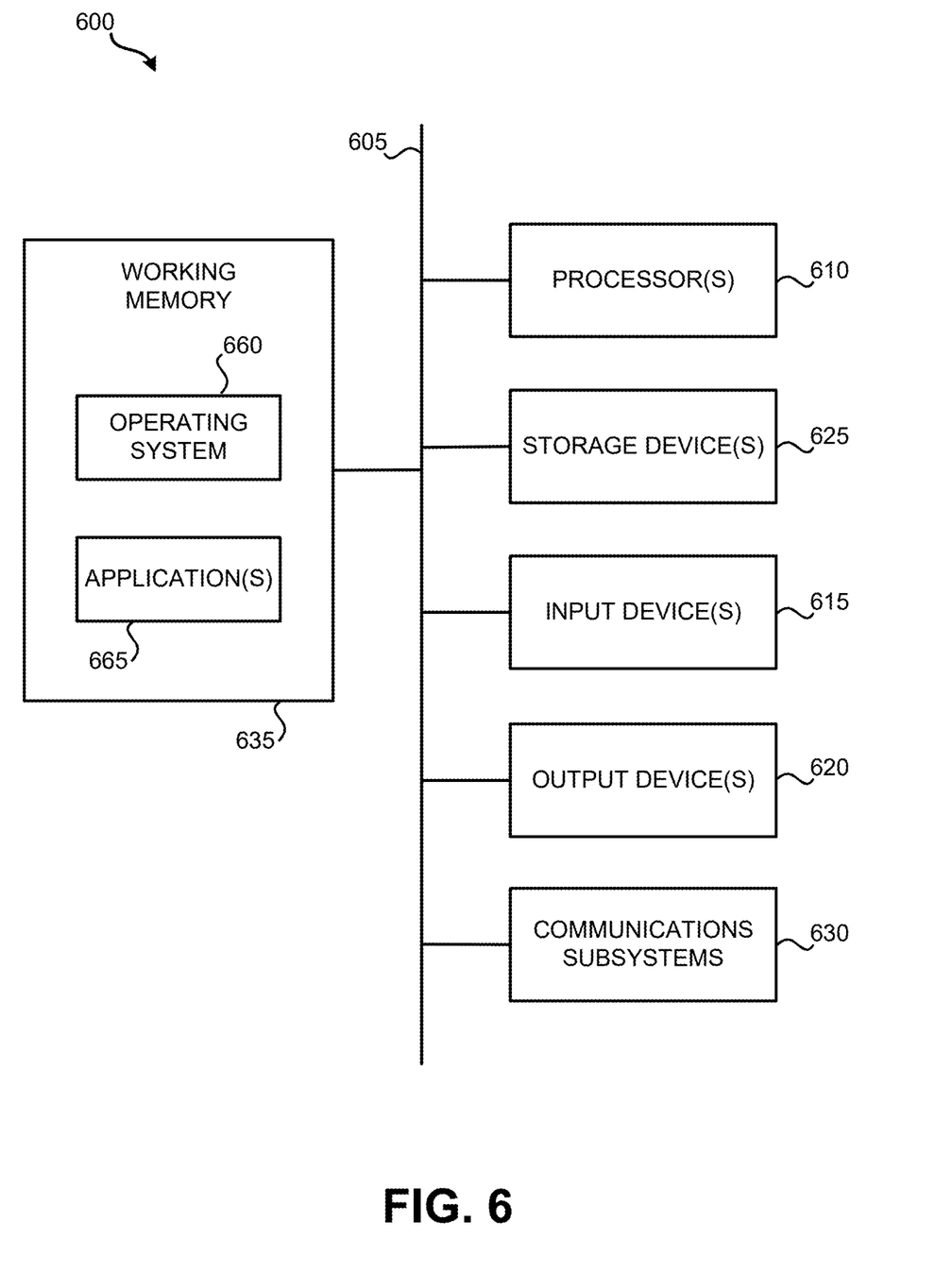
FIG. 6 is a schematic diagram illustrating an embodiment of a computer system according to various embodiments.

The systems 100 and 200, or any components thereof, such as the media device 106, UE 108, AP 110, MDU gateway device 112, routers 114, headend 160, content management system 150, etc., described above may include a computer system or device that further includes computer hardware and software that form special-purpose network circuitry to implement various embodiments such as communication, generation of data, determination, identification, calculation, performing a method or process block, and other operations or steps of the methods or processes described herein. FIG. 6 is a schematic diagram illustrating an example of computer system or device 600. The computer system 600 is a simplified computer system that can be used to implement various embodiments described and illustrated herein. FIG. 6 provides a schematic illustration of one embodiment of a computer system 600 that can perform some or all of the steps of the methods and workflows provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner. The computer system 600 is shown including hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, and/or the like; and one or more output devices 620, which can include without limitation a display device, a printer, and/or the like.

The computer system 600 may further include and/or be in communication with one or more non-transitory storage devices 625, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset such as a Bluetooth™ device, a 802.11 device, a WiFi device, a WiMax device, cellular communication facilities, etc., and/or the like. The communications subsystem 630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 630. In other embodiments, a portable electronic device, e.g., the first electronic device, may be incorporated into the computer system 600, e.g., an electronic device as an input device 615. In some embodiments, the computer system 600 will further include a working memory 635, which can include a RAM or ROM device, as described above.

The computer system 600 also can include software elements, shown as being currently located within the working memory 635, including an operating system 660, device drivers, executable libraries, and/or other code, such as one or more application programs 665, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 6, might be implemented as code and/or instructions executable by a computer and/or a processor within a computer; in one embodiment, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, and the storage medium can be used to program, configure, and/or adapt a general-purpose computer with the instructions/code stored thereon. These instructions might take the form of executable code, which is executable by the computer system 600 and/or might take the form of source and/or installable code, which, upon compilation and/or installation on the computer system 600 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, some embodiments may employ a computer system such as the computer system 600 to perform methods in accordance with various embodiments of the technology. According to a set of embodiments, some or all of the operations of such methods are performed by the computer system 600 in response to processor 610 executing one or more sequences of one or more instructions, which might be incorporated into the operating system 660 and/or other code, such as an application program 665, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. In one embodiment, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may, in one embodiment, be stored on a non-transitory storage device 625 either before or after execution by the processor(s) 610.

The methods, systems, and devices discussed above are examples. Various configurations may omit, substitute, or add various procedures or components as appropriate. For instance, in some embodiments, the methods may be performed in an order different from that described, and/or various stages may be added, omitted, and/or combined. Also, features described with respect to certain configurations may be combined in various other configurations. Various embodiments of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the embodiments of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a segment" includes a plurality of such segments, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered.

What is claimed is:

1. A method, comprising:
   accessing, by a content management system, media device information about a media device to be installed in a multi-dwelling unit (MDU) property, wherein the media device information is extracted from a machine-readable (MR) identifier on the media device and transmitted to the content management system;
   accessing, by the content management system, an MDU property identifier of the MDU property;
   identifying, by the content management system, an MDU property profile corresponding to the MDU property identifier;
   identifying, by the content management system, a media device configuration profile corresponding to the media device, based at least in part on the media device information and the MDU property profile; and
   transmitting, by the content management system, the media device configuration profile to the media device such that the media device is enabled to perform a configuration according to the media device configuration profile.

2. The method of claim 1, wherein transmitting the media device configuration profile to the media device further comprises:
   transmitting the media device configuration profile to a headend associated with the MDU;
   verifying, by the headend, that the media device is connected to the headend; and
   sending the configuration profile, by the headend, to the media device.

3. The method of claim 1, wherein the MDU property profile comprises a list of content providers that provide content to the MDU property.

4. The method of claim 3, wherein the media device configuration profile comprises pre-set user access control parameters and pre-set streaming configuration parameters associated with each one of the content providers.

5. The method of claim 4, wherein the media device configuration profile further comprises pre-set network parameters, pre-set proxy configuration parameters for connecting through a proxy server, pre-set bandwidth allocation parameters, pre-set Quality of Service (QOS) parameters, and pre-set encryption-decryption parameters.

6. The method of claim 1, further comprising:
   receiving, in the media device, a content item, wherein the content item is requested by an MDU user of the MDU property and sent from a user equipment (UE) connected to the media device;
   processing, by the media device, content streams of the requested content item, based on predetermined streaming parameters indicated in the media device configuration profile; and
   sending the content streams, by the media device, to the UE.

7. The method of claim 6, further comprising:
   receiving, in a headend associated with the MDU, a user request for streaming the content item, the user request indicating user identity and user authentication information about the MDU user;
   authenticating, by the headend, the MDU user based on the user authentication information; and
   verifying, by the headend, that the media device is connected to the headend.

8. The method of claim 1, further comprising:
   receiving, in the content management system, a request for installing and configuring the media device in the MDU property, the request sent from an installer device; and
   in response to the request for installing and configuring the media device, sending, by the content management system, a request for scanning the MR identifier of the media device to the installer device,
   wherein a scanner of the installer device is automatically activated to scan the MR identifier, and the media device information is extracted from the MR identifier and sent to a web portal of the content management system by the installer device.

9. The method of claim 8, further comprising:
   tracking, by the installer device, a location of the installer device;
   determining, by the installer device, the MDU property ID based on the location of the installer device when the MR identifier is scanned by the scanner of the installer device; and
   automatically sending the MDU property identifier, by the installer device, to the content management system.

10. The method of claim 1, wherein the media device is a set-back box (SBB).

11. A system comprising:
    a media device to be installed in a multi-dwelling unit (MDU) property of an MDU, the media device having a machine-readable (MR) identifier encapsulating pre-encoded media device information associated with the media device;
    a content management system; and
    an installer device operable by a media device installer, wherein the installer device is configured to:
    scan the MR identifier and extract the media device information encapsulated in the MR identifier;

obtain an MDU property identifier of the MDU property; and
transmit the media device information and the MDU property identifier to the content management system;
wherein the content management system is configured to:
identify a pre-established MDU property profile corresponding to the MDU property identifier; and
identify a media device configuration profile corresponding to the media device, based at least in part on the media device information and the MDU property profile,
wherein the media device is configured to:
receive the media device configuration profile; and
automatically perform a configuration according to the received configuration profile.

12. The system of claim 11, further comprising a headend associated with the MDU,
wherein the content management system is further configured to transmit the media device configuration profile to the headend,
wherein the headend is configured to send the configuration profile to the media device, upon verifying the media device is connected to the headend.

13. The system of claim 11, wherein the MDU property profile comprises a list of content providers that provide content to the MDU property.

14. The system of claim 13, wherein the media device configuration profile comprises pre-set user access control parameters and pre-set streaming configuration parameters associated with each one of the content providers.

15. The system of claim 14, wherein the media device configuration profile further comprises pre-set network parameters, pre-set proxy configuration parameters for connecting through a proxy server, pre-set bandwidth allocation parameters, pre-set Quality of Service (QOS) parameters, and pre-set encryption-decryption parameters.

16. The system of claim 11, wherein the media device is further configured to:
receive a content item, wherein the content item is requested by an MDU user of the MDU property and sent from a user equipment (UE) connected to the media device;
generate content streams of the requested content item, based at least in part on predetermined streaming parameters indicated in the media device configuration profile; and
transmit the content streams to the UE.

17. The system of claim 11, wherein the content management system is further configured to:
receive a request for installing and configuring the media device in the MDU property, the request sent from the installer device; and
in response to the request for installing and configuring the media device, transmit a request for scanning the MD identifier of the media device to the installer device,
wherein a scanner of the installer device is automatically activated to scan the MR identifier, and the media device information is extracted from the MR identifier and sent to a web portal of the content management system by the installer device.

18. The system of claim 17, wherein the installer device is further configured to:
track a location of the installer device;
determine the MDU property ID based on the location of the installer device when the MR identifier is scanned by the scanner of the installer device; and
automatically transmit the MDU property identifier to the content management system.

19. The system of claim 11, wherein the media device is a television.

20. A media device to be installed in a multi-dwelling unit (MDU) property of an MDU, the media device comprising:
an machine-readable (MR) identifier containing pre-encoded media device information about the media device;
one or more processors; and
a computer-readable storage media storing computer-executable instructions that, when executed by the one or more processors, cause the media device to:
receive a pre-established media device configuration profile, wherein the pre-established configuration profile is generated by a content management system based at least in part on the media device information and a pre-established MDU property profile, the media device information is extracted from the MR identifier and accessed by the content management system, the pre-established MDU property profile is stored in a database of the content management system and identified by the content management system based on an MDU property identifier accessed by the content management system;
automatically perform a configuration according to the media device configuration profile;
receive a content item, wherein the content item is requested by an MDU user of the MDU property and sent from a user equipment (UE) connected to the media device;
process content streams of the requested content item, based on predetermined streaming parameters indicated in the media device configuration profile; and
transmit the content streams to the UE.

* * * * *